Nov. 17, 1970     I. COCHIN     3,540,293
COMBINATION GYROSCOPE AND ACCELEROMETER
Filed Jan. 4, 1968     4 Sheets-Sheet 1

INVENTOR.
IRA COCHIN
BY
ATTORNEY

INVENTOR.
IRA COCHIN

ATTORNEY

INVENTOR.
IRA COCHIN

United States Patent Office 3,540,293
Patented Nov. 17, 1970

3,540,293
COMBINATION GYROSCOPE AND ACCELEROMETER
Ira Cochin, Maywood, N.J., assignor to The Bendix Corporation, a corporation of Delaware
Filed Jan. 4, 1968, Ser. No. 695,699
Int. Cl. G01c 19/28
U.S. Cl. 74—5             12 Claims

ABSTRACT OF THE DISCLOSURE

A two axis gyroscope used for information and control in which the spinning wheel is suspended between two synchronized motors and is also utilized simultaneously as a stabilizing gyro and the proof mass in a two axis accelerometer.

BACKGROUND OF THE INVENTION

Field of the invention

The invention relates to the field of gyroscopes as exemplified by U.S. Patent Office Classification 74—5.

Description of the prior art

In the past, accelerometers utilized a gyroscope to stabilize a set of gimbals and which a two axis accelerometer is mounted. The spinning wheel was pivotally mounted by means of pivots, bearings, or the like. Such means are subject to both friction and mechanical wear which affects the accuracy of the device. In the present invention, the gyroscope serves a dual function, as a gyroscope and an accelerometer. Further, the spinning wheel is mounted on a wire thus eliminating the use of pivots, bearings or the like.

SUMMARY OF THE INVENTION

The present invention provides a combined gyroscope and accelerometer in which the spinning wheel is suspended between two synchronized motors on a wire. Magnets are provided to eliminate torques due to bending of the wire. Also an auxiliary motor is provided for initial spin-up.

DSECRIPTION OF THE PREFERRED EMBODIMENTS

Figure 1:
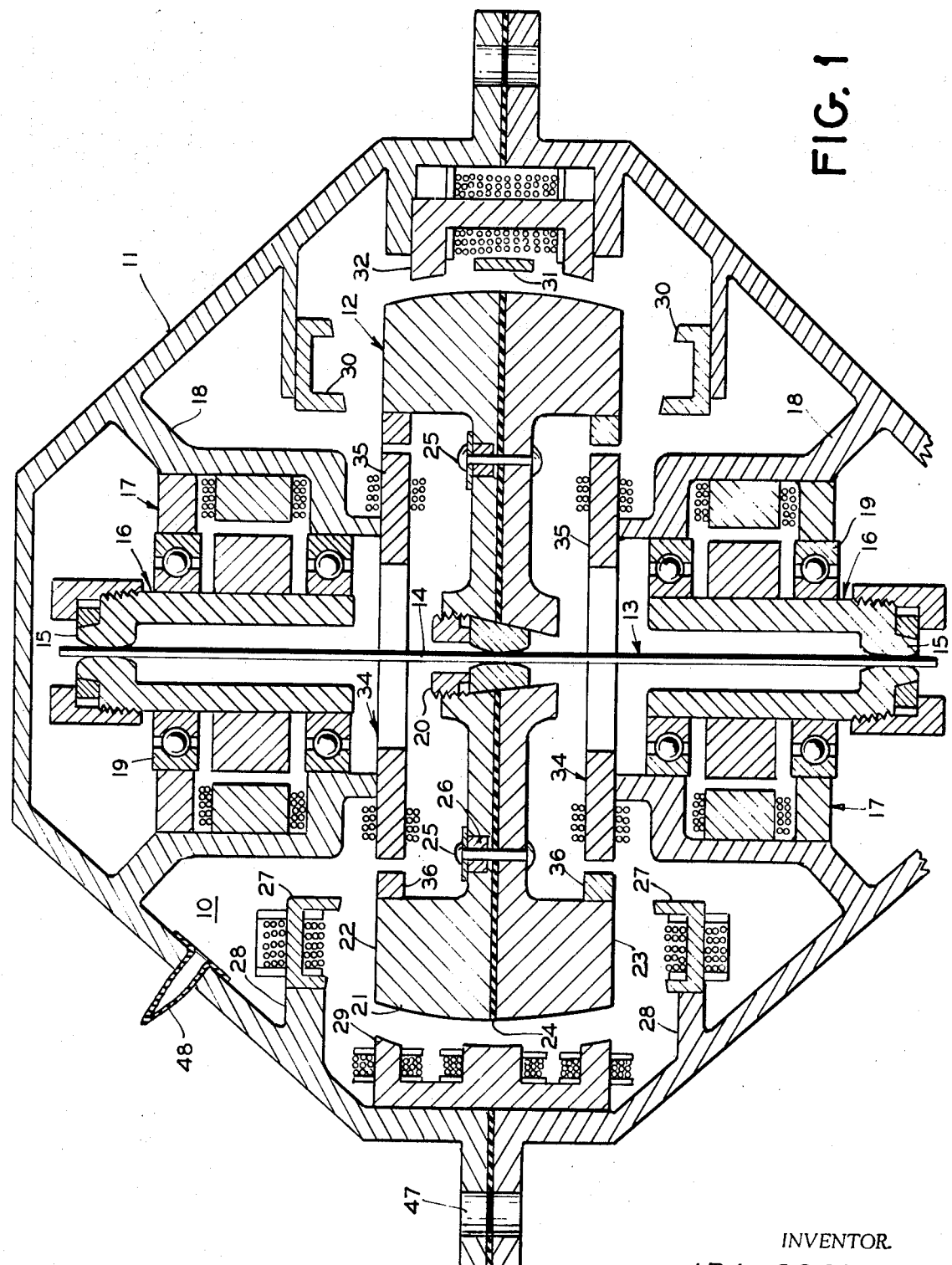
FIG. 1 is a schematic partial sectional view of a device embodying the invention and taken along the lines 1—1 of FIG. 2.
Figure 2:
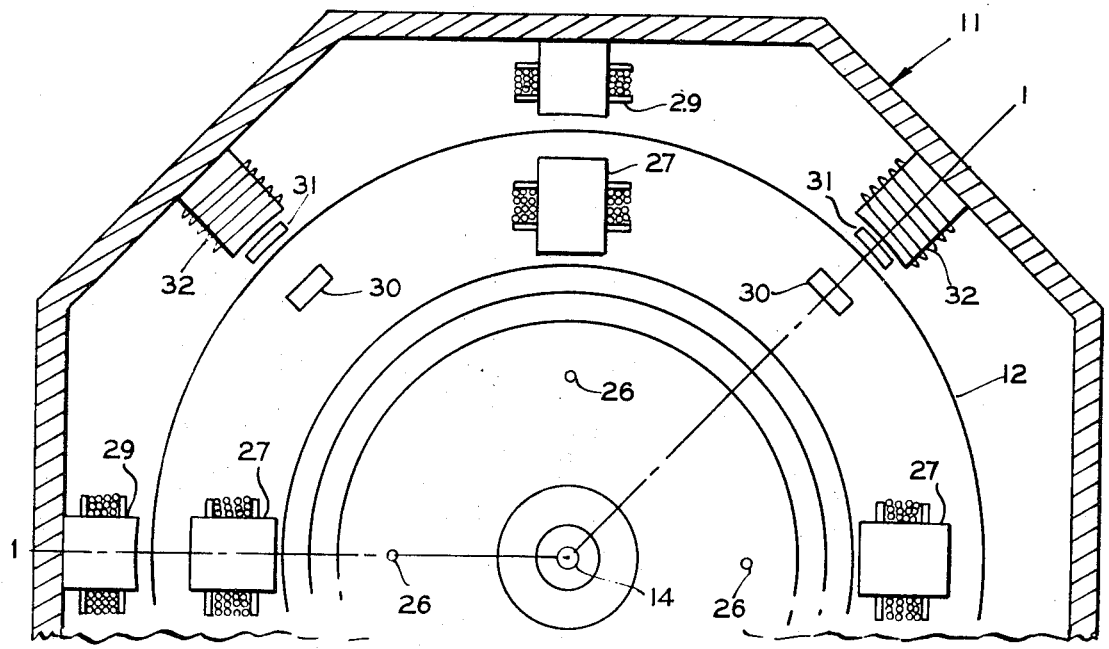
FIG. 2 is a schematic partial fragmentary plan view of the device of FIG. 1 with the housing and certain parts broken away so as to better illustrate the operative arrangement of the device.

Referring now to the drawings, in FIGS. 1 and 2 a combined gyroscope and accelerometer is indicated generally by the numeral 10 and includes a housing 11. The housing 11 contains a fly wheel or gyro rotor 12 of symmetrical configuration and adapted for rotation about a spin axis 13 centrally passing therethrough. The wheel 12 is mounted for rotation by a thin flexible wire 14 secured by collets 15 and rotor shafts 16 of two similar synchronous motors 17. The motors 17 are secured to the housing 11 by brackets 18 or other suitable means. The rotor shafts 16 of the motors 17 are mounted in the motor housing by bearings 19. The wheel 12 is secured to the wire 14 for rotation therewith by means of a collet 20 which may be of the three jaw type in which the jaws are tightened by means of a nut forcing the jaws on an inclined plane. The wheel 12 has a spherical contour 21 and is made up of a top half 22 and a bottom half 23 both of magnetic material, with a layer of insulation 24 therebetween and secured together by rivets 25 with an insulating member 26 between the rivets 25 and the top half 22. While insulation material has been illustrated and described as a means for reducing eddy currents in the wheel 12, it is understood that other means could be utilized, for example, laminations, sintered materials or other suitable means.

To precess the wheel 12 for purposes of earth rate compensation or other navigation functions there are provided a number of symmetrically placed torquers 27 on each side of the wheel 12 adjacent the outer edge thereof. The torquers 27 are supported in the housing 11 by brackets 28 or in any other suitable manner. The torquers may be of a conventional type, for example, electromagnetic.

In order to provide an indication of the relative movement between the wheel 12 and the housing 11 caused by the housing 11 tilting or pivoting about either of its sensitive axis, two pair of electrical pickup means 29 are provided. The pickup means 29 are supported in the housing 11 in register with the wheel 12 and may be of the E bridge type normally used in gyroscope construction.

Figure 3:
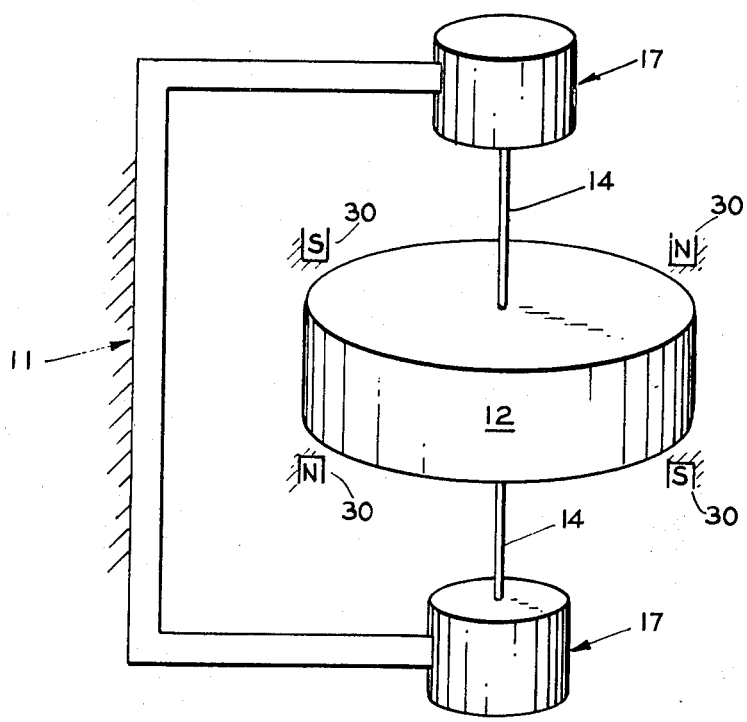
FIGS. 3 and 4 are diagrammatical representations illustrating one feature of the invention.
Figure 4:
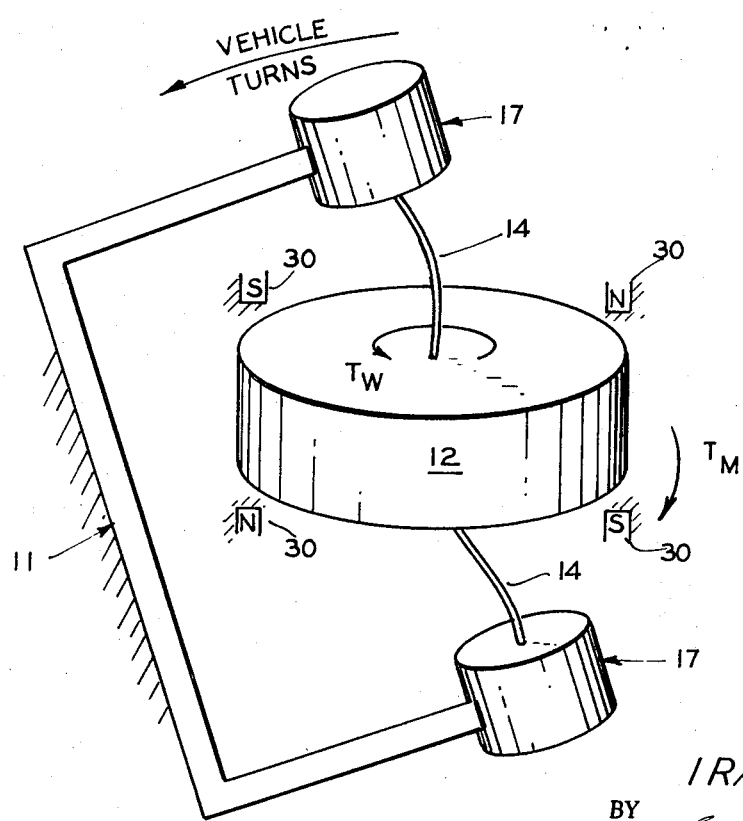

The wire 14 serves as a flexible drive and also as a vertical support for the wheel 12. With the wheel 12 rotating at high speed it maintains its same orientation in space even though the housing 11 tilts or pivots. This will cause the wire 14 to bend (see FIGS. 3 and 4). This causes a torque in a direction to oppose any displacement between the wheel 12 and the housing 11. The torque developed by the bending of the wire 14 is offset by a plurality of properly spaced magnets 30 which act in opposition to the torque resulting in zero net torque on the wheel 14. The magnets 30 are positioned in pairs with one magnet of each pair above the wheel 12 and the other magnet under the wheel and in alignment with each other. The magnets 30 may be either permanent magnets, D.C. electromagnets or electromagnets using alternating current with a high frequency carrier to minimize non-linearities.

Figure 5:
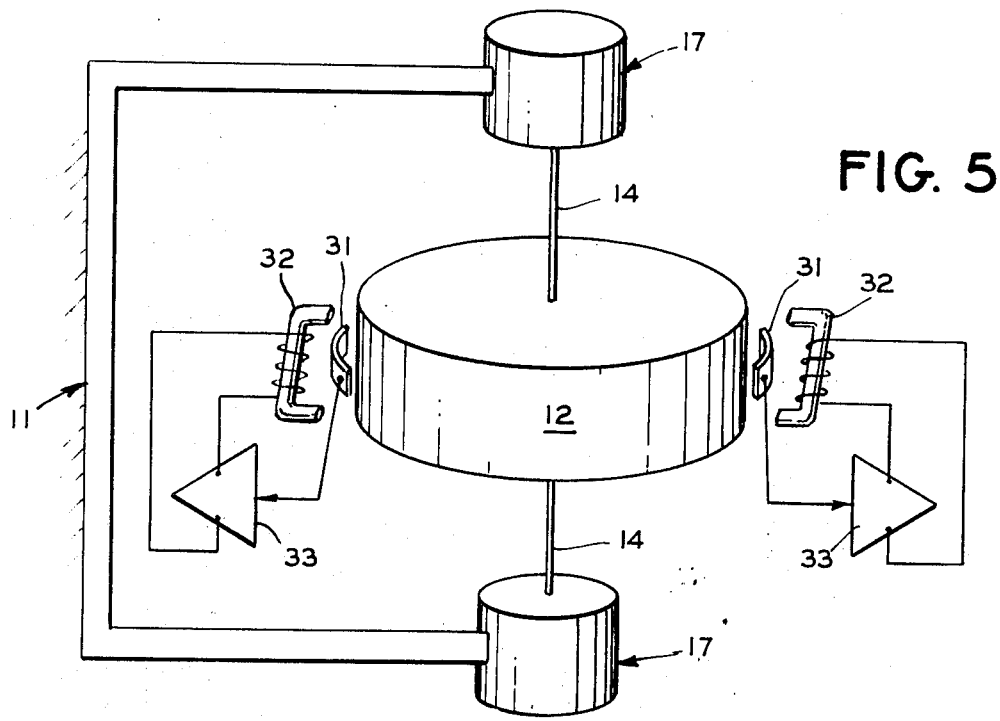
FIGS. 5 and 6 are diagrammatical representations illustrating another feature of the invention.
Figure 6:
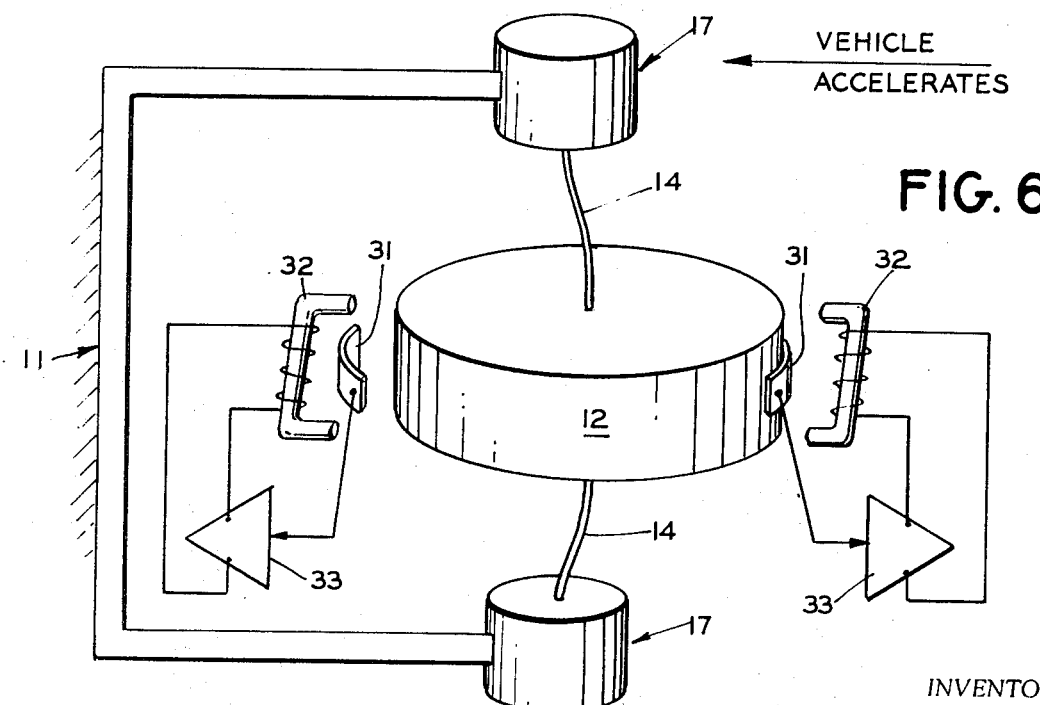

In order to function as an accelerometer, sensors or pickups 31 are supported in the housing 11 and spaced 90 degrees apart. The sensors 31 may be of the capacitive type. In addition to the sensors 31, force balance coils 32 are supported in the housing 11 and spaced 90 degrees apart. Referring now to FIGS. 5 and 6, when the vehicle, in which the device 10 is mounted accelerates, the wheel 12 translates horizontally. In so doing, the wheel approaches one of the sensors 31 and moves away from another of the sensors 31. The unbalance of the sensors 31 provides an indicator of the acceleration. Appropriate servo amplifiers 33, indicated diagrammatically in FIGS. 5 and 6, and the force balance coils 32 restore the wheel to its centered position.

In order to provide a fast initial spin-up of the wheel 12 and also prevent winding up or twisting of the wire 14, a pair of auxiliary motors 34 which act directly on the wheel 12 are provided. The motors 34 have a stationary member 35 secured to the housing 11 by suitable means (not shown). The motors 34 have a rotating member 36 mounted on the wheel 12. Upon the wheel 12 reaching normal operational speed, the motors 34 are shut off and remain off during normal gyro operation.

Figure 7:
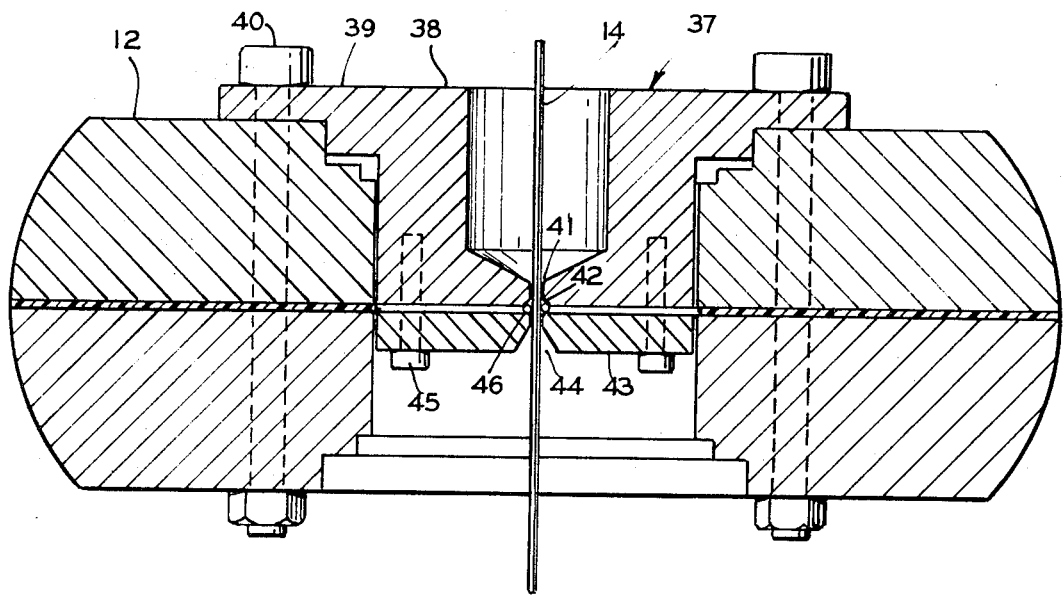
FIG. 7 is a sectional view of a different collet for fastening the wheel to the wire.

Referring now to FIG. 7 for illustration of another method of securing the wheel 12 to the the wire 14, a collet is indicated generally by the numeral 37. The collet 37 has a cup shaped member 38 having a flanged section 39 which is secured to the wheel 12 by bolts 40 or any other suitable manner. The member 38 has an opening 41 in the center thereof with an inclined surface 42 on the outer edge thereof. A plate 43 having an opening 44 in the center is secured to the member 38 by bolts 45 with the openings 41 and 44 being in register. Balls 46, for example three, are forced along the inclined surface 42 to securely grip the wire 14 by the plate 43.

In order to reduce the windage drag on the wheel 12, the housing 11 may be hermetically sealed by seal 47 and evacuated through exhaust tubulation 48. After being evacuated, the tubulation 48 is sealed off.

In operation, the two synchronous motors 17 drive the wheel 12 by means of the wire 14 upon which the wheel 12 is supported. As the vehicle, on which the device is mounted, maneuvers, the thin flexible wire 14 bends so that the wheel 12 retains its fixed orientation in space and does not follow the movement of the housing 11. The torque that is developed by the bending of the wire 14 is offset by the magnets 30. This results in zero torque on the wheel 12. Thus, the wire 14 provides a frictionless pivot over a limited angular range while also serving as the driving means for the wheel 12. The pick up means 29 provide an indication of the relative displacement from the horizontal axis of the housing 11 thus providing the functions of a gyroscope.

If the vehicle accelerates in the horizontal plane, the wheel 12 moves horizontally by the bending of the wire 14 and approaches one sensor while moving away from the other. The force balance coils 32 generate only the horizontal components of the acceleration vector. The vertical component is supplied by the wire 14. By measuring the current in each of the coils 32, the device functions as a two axis accelerometer.

Although only one embodiment of the invention has been illustrated and described, various changes in the form and relative arrangements of the parts, which will now appear to those skilled in the art, may be made without departing from the scope of the invention.

What is claimed is:

1. A combination gyroscope and accelerometer comprising a housing, a pair of synchronized motors, said motors being mounted in a vertical plane in said housing opposite each other, a wheel, means including a flexible wire extending between and secured to said motors for rotation therewith flexibly supporting said wheel in a plane substantially at right angles to said wire, magnet means mounted in said housing and opposite sides of said wheel to provide compensation for flexure of said wire, torquer means for maintaining said wheel in a predetermined plane, sensing means responsive to tilting movement between said housing and said wheel for producing a signal proportional thereto, and pickup means for sensing changes in space along a horizontal plane between said wheel and said housing to produce a signal proportional to the magnitude and direction of said change.

2. The combination as set forth in claim 1 and including means responsive to said pickup means to restore said wheel to a centered position.

3. The combination as set forth in claim 2 and including a servo amplifier for changing the excitation of said last means in response to the said pickup means.

4. The combination as set forth in claim 1 in which said wheel is secured to said wire by a three jaw collet.

5. The combination as set forth in claim 1 in which said wheel is secured to said wire by a ball collet.

6. The combination as set forth in claim 1 in which said magnet means are spaced symmetrically around the wheel in pairs with one magnet of each pair being above the wheel and the other being under the wheel.

7. The combination as set forth in claim 6 in which said magnets are permanent magnets properly spaced and of a strength to counteract torque developed by the flexing of said wire.

8. The combination as set forth in claim 6 in which said magnet means are electromagnets.

9. The combination as set forth in claim 8 in which said electromagnets use alternating current with high frequency carriers to minimize nonlinearities.

10. The combination as set forth in claim 1 in which said wire is secured in the opposite ends of said motors by collets.

11. The combination as set forth in claim 1 and including a pair of synchronous motors positioned to act directly on the wheel for initial spin up.

12. The combination as set forth in claim 1 and including means for reducing the eddy currents in said wheel.

References Cited

UNITED STATES PATENTS

| | | | |
|---|---|---|---|
| 2,852,943 | 9/1958 | Sedgfield | 74—5.6 XR |
| 2,942,864 | 6/1960 | Sikora | 73—504 XR |
| 3,251,233 | 5/1966 | Duncan et al. | 74—5.6 XR |
| 3,283,587 | 11/1966 | Hoffman | 73—504 |
| 3,301,073 | 1/1967 | Howe | 74—5 XR |
| 3,323,040 | 5/1967 | Wright | 73—517 |

MANUEL A. ANTONAKAS, Primary Examiner

U.S. Cl. X.R.

73—504; 74—5.6